United States Patent
Spiegel

(12) 
(10) Patent No.: US 6,305,317 B1
(45) Date of Patent: Oct. 23, 2001

(54) INFLATABLE WHELPING CONTAINER

(76) Inventor: H. Jay Spiegel, P.O. Box 444, Mount Vernon, VA (US) 22121

( * ) Notice: Subject to any disclaimer, the term of this patent is extended or adjusted under 35 U.S.C. 154(b) by 0 days.

(21) Appl. No.: 09/477,383

(22) Filed: Jan. 4, 2000

(51) Int. Cl.[7] .......................... A01K 1/035; A01K 29/00
(52) U.S. Cl. ........................................ 119/28.5; 119/174
(58) Field of Search .................. 119/28.5, 174; 5/694

(56) References Cited

U.S. PATENT DOCUMENTS

| | | | |
|---|---|---|---|
| 3,902,456 | * | 9/1975 | David .................. 119/28.5 |
| 4,064,835 | * | 12/1977 | Rabenbauer ........ 119/28.5 |
| 4,274,363 | * | 6/1981 | Root .................... 119/28.5 |
| 4,996,944 | * | 3/1991 | Zook et al. .......... 119/28.5 |
| 5,010,843 | * | 4/1991 | Henry .................. 119/28.5 |

OTHER PUBLICATIONS

The Health of Your Dog by John Bower & David Youngs Published 1989 p. 196.

* cited by examiner

*Primary Examiner*—Robert P. Swiatek
(74) *Attorney, Agent, or Firm*—H. Jay Spiegel

(57) ABSTRACT

A whelping container is made of a flexible, plastic or rubber material and is inflatable. The container may include two or more subchambers, each of which includes its own separate inflation/deflation valve. The material used is employed in sufficient thickness to provide sufficient strength to resist damage from chewing or scratching by the mother or her puppies. The container has a floor partially defined by an inflation chamber to provide cushioning for the mother and puppies within the container. The top surface of the container overhangs the periphery of the floor to define a peripheral chamber about the periphery of the floor. This peripheral chamber serves the purpose of providing a place where a puppy can escape if the mother is in a position where she might roll over the puppy and otherwise smother it. Two sets of vents extend through walls of the container to vent the peripheral chamber to atmosphere. Thus, if a puppy enters the peripheral chamber either to rest or to escape the mother who is rolling over to a location where she might overlie the puppy, these vents provide air flow into the peripheral chamber so that the puppy can survive being located therein.

14 Claims, 2 Drawing Sheets

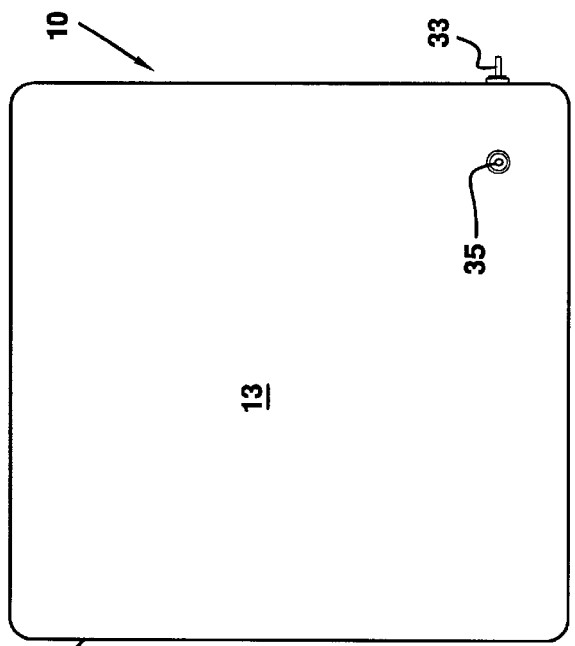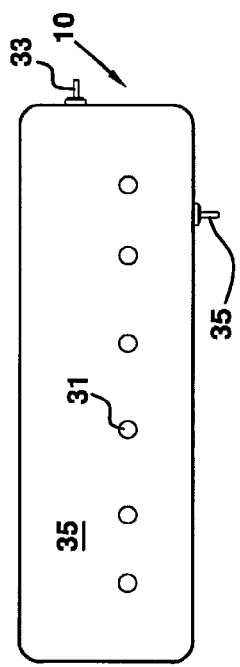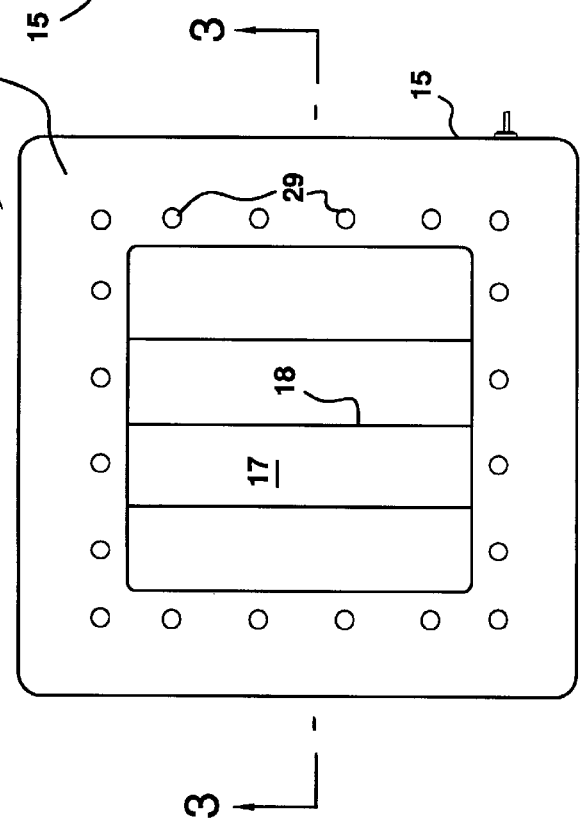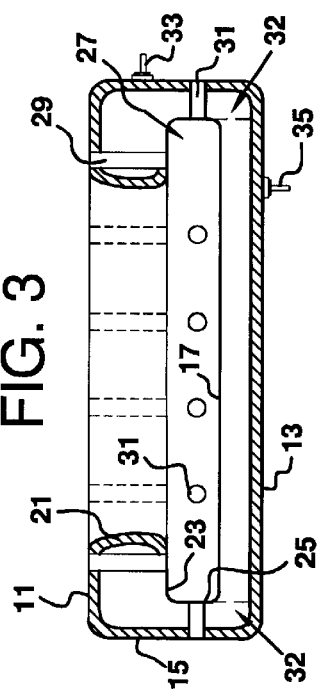

INFLATABLE WHELPING CONTAINER

BACKGROUND OF THE INVENTION

The present invention relates to an inflatable whelping container. In the prior art, it is known to construct a whelping container out of wood, metal or combinations thereof. In essence, an enclosure is provided where a pregnant dog may deliver puppies. Often, the enclosure includes a steel or wooden cage to restrain the location of the dog.

Often, the breeder constructs a "puppy rail" that is designed to prevent the puppies from being smothered by the mother during the nursing period. In essence, a "puppy rail" consists of a structure designed to fit around the edges of the containment area and including a region below its surface that permits puppies to slide thereunder instead of allowing the mother to roll over the puppies and smother them. Often such structures are made of wood products and may be prone to splintering, thereby creating the potential for damage or injury to the mother or her puppies. Additionally, once the puppies are weaned and there is no further use for the "puppy rail", it must be stored in a large storage area since it may not be easily collapsed without disassembling it.

As such, a need has developed for a whelping container that is effective in use but easily stored between uses.

SUMMARY OF THE INVENTION

The present invention relates to an inflatable whelping container. The present invention includes the following interrelated objects, aspects and features:

(1) In a first aspect, the inventive whelping container is made of a flexible, plastic or rubber material and is inflatable. If desired, the inventive container may be made including two or more subchambers, each of which includes its own separate inflation/deflation valve. The material used is employed in sufficient thickness to provide sufficient strength to resist damage from chewing or scratching by the mother or her puppies.

(2) The inventive container may have a floor that preferably is partially defined by an inflation chamber to provide cushioning for the mother and puppies within the container. The container also includes a top surface that extends downwardly part of the way toward the floor with the top surface defining an altitude above the floor that is sufficiently high so as to make it difficult for puppies to climb out of the container. If desired, the floor could be omitted.

(3) The top surface described in paragraph (2) above overhangs the periphery of the floor to define a peripheral chamber about the periphery of the floor. This peripheral chamber serves the purpose of providing a place where a puppy can escape if the mother is in a position where she might roll over the puppy and otherwise smother it.

(4) Two sets of vents extend through walls of the container to vent the peripheral chamber to atmosphere. Thus, if a puppy enters the peripheral chamber either to rest or to escape the mother who is rolling over to a location where she might overlie the puppy, these vents provide air flow into the peripheral chamber so that the puppy can survive being located therein.

As such, it is a first object of the present invention to provide an inflatable whelping container.

It is a further object of the present invention to provide such a container including a peripheral subchamber designed to provide a location where puppies can travel to avoid being smothered by their mother.

It is a further object of the present invention to provide such a container including vents to vent the peripheral subchamber to the atmosphere.

It is a still further object of the present invention to provide such a device wherein the container is inflatable in use and deflatable for easy storage.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a top view of the present invention.

FIG. 2 shows a bottom view of the present invention.

FIG. 3 shows a cross-sectional view along the line 3—3 of FIG. 1.

FIG. 4 shows a side view of the present invention.

SPECIFIC DESCRIPTION OF THE PREFERRED EMBODIMENT

Figure 5:
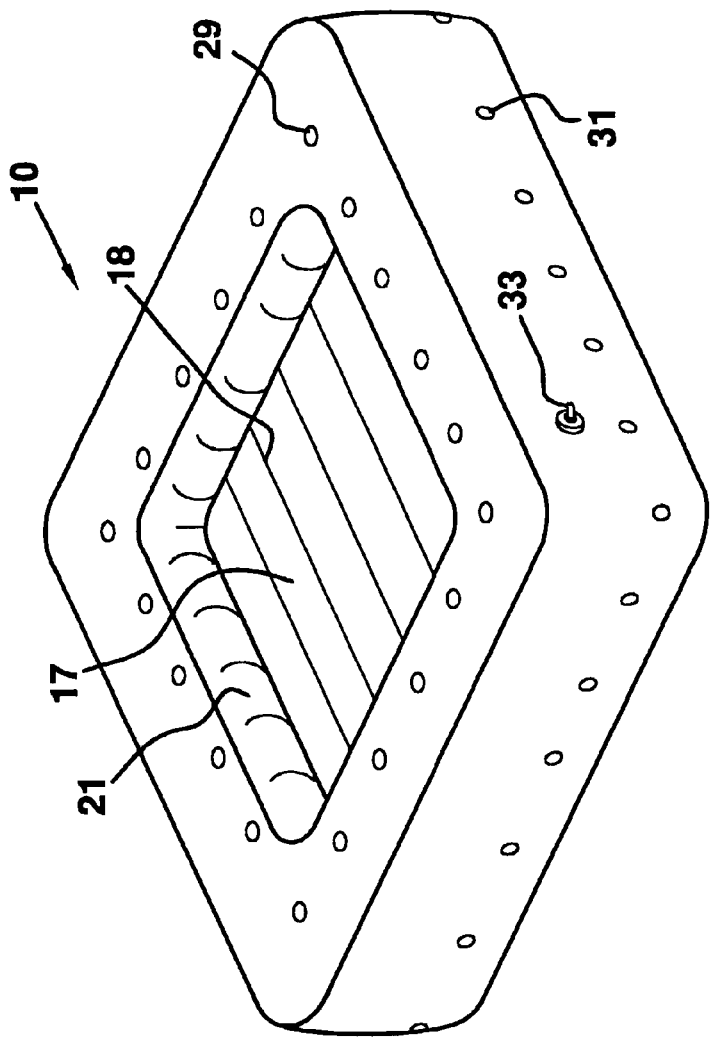
FIG. 5 shows a perspective view of the present invention.

With reference to the figures, the present invention is generally designated by the reference numeral 10 and is seen to include a top wall 11, a bottom wall 13, and outer peripheral side walls 15. As best seen in FIGS. 1, 3 and 5, the inventive container includes a floor 17. With reference to FIGS. 3 and 5, in particular, the top wall or surface 11 is connected to inner walls 21 that hang down toward the floor 17, depending from the inner extent of the top wall or surface 11 but terminate in the downward direction vertically spaced therefrom. An overhang is defined by an outwardly extending wall 23, seen in FIG. 3, which terminates in a vertically extending peripheral wall 25 that connects to the floor 17 and defines inner extents of the outer side walls 15.

As best seen in FIG. 3, the walls 23 and 25 together with the outer periphery of the floor 17 define a peripheral chamber 27 at the outer periphery of the floor 17.

Vent passages 29 extend vertically venting the peripheral chamber 27 to atmosphere. Similarly, vent passages 31 extend horizontally from the peripheral chamber 27 and vent the peripheral chamber 27 to atmosphere. The passages 29 and 31 may be made of relatively rigid material to preclude kinking to ensure air flow.

Inflation nozzles 33 and 35 allow inflation of the container 10 (FIGS. 2, 3 and 4). If desired, the container 10 may be subdivided into two or more chambers with each inflation nozzle being provided to allow inflation and deflation of one subchamber.

As should be understood with particular reference to FIG. 3, the peripheral chamber 27 is provided under the overhang provided by the wall 21 to allow a puppy a means of escape should the mother move to a position where the mother might overlie the puppy and smother it. When such a circumstance occurs, the peripheral chamber 27 provides a space where the puppy can roll or otherwise go to avoid smothering. So that the peripheral chamber 27 is a place where a puppy can breathe air until such time as it is safe to leave the peripheral chamber 27, vent passageways 29 and 31 are provided throughout the periphery of the subchamber 27 to allow breathing air to have access to the peripheral chamber 27.

The inflation nozzle 33 is provided to allow inflation of that portion of the container 10 above the vent passageways 31. The inflation nozzle 35 is provided for those areas of the container 10 below the inflation passageways 31. Although not shown in the figure, structure is provided that divides the container 10 into two subchambers for this purpose.

FIGS. 1 and 5 depict the floor 17 as having a plurality of lines 18 therein that provide a surface texture. Of course, any desired surface texture may be employed.

If desired, the floor 17 could be omitted. In such a modification, peripheral walls would be formed at 32 (FIG. 3) and the floor 17 and bottom wall would be omitted. The body 10 would sit on an existing floor surface with the walls 32, 21 and the chamber 27 defining an enclosed area.

In the preferred embodiment of the present invention, the inventive container 10 is made of a strong fluid and gas impervious material such as flexible plastic or rubber. The material chosen must be able to resist substances that are used to clean and sterilize the container 10 while also being tough and strong and able to withstand scratching and chewing by animals without losing its strength or integrity. Suitable plastics or rubber materials may be employed for these purposes as is well known to those skilled in the art.

As such, an invention has been disclosed in terms of a preferred embodiment thereof which fulfills each and every one of the objects of the invention as set forth hereinabove and provides a new and useful inflatable whelping container of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. An inflatable whelping container comprising:
   a) an inflatable body having outer side walls, a floor surface, inner side walls and a top surface between upper terminations of said inner and outer side walls;
   b) said inner side walls depending downwardly from said top surface and having lower terminations spaced above said floor surface;
   c) a peripheral chamber outward of said inner side walls and beneath, in elevation, said lower terminations of said inner side walls, said chamber having an outer peripheral extent defined by said outer side walls and having an inwardly facing peripheral opening defined between said floor surface and said lower terminations of said inner side walls; and
   d) vent means spaced from said peripheral opening for providing air supply to said peripheral chamber.

2. The container of claim 1, wherein said body is generally rectangular.

3. The container of claim 1, wherein said body defines a plurality of inflatable subchambers.

4. The container of claim 3, wherein one of said subchambers is beneath said floor surface.

5. The container of claim 1, wherein said vent means comprises a plurality of horizontally extending passageways.

6. The container of claim 1, wherein said vent means comprises a plurality of vertically extending passageways.

7. The container of claim 6, wherein said vent means further comprises a plurality of horizontally extending passageways.

8. The container of claim 1, wherein said vent means comprises a vent passage.

9. An inflatable whelping container comprising:
   a) an inflatable body having inner side walls, outer side walls, a top surface extending between upper terminations of said inner and outer side walls, and a peripheral bottom surface extending inwardly from lower terminations of said outer side walls and adapted to sit on and enclose an existing floor surface;
   b) said inner side walls depending downwardly from said top surface and having lower terminations spaced above said floor surface;
   c) a peripheral chamber outward of said inner side walls and beneath, in elevation, said lower terminations of said inner side walls, said chamber having an outer peripheral extent defined by said outer side walls and having an inwardly facing peripheral opening defined between said floor surface and said lower terminations of said inner side walls; and
   d) vent means spaced from said peripheral opening for providing air supply to said peripheral chamber.

10. The container of claim 9, wherein said body is generally rectangular.

11. The container of claim 9, wherein said vent means comprises a plurality of horizontally extending passageways.

12. The container of claim 9, wherein said vent means comprises a plurality of vertically extending passageways.

13. The container of claim 12, wherein said vent means further comprises a plurality of horizontally extending passageways.

14. The container of claim 9, wherein said vent means comprises a vent passage.

* * * * *